(12) United States Patent
Gao et al.

(10) Patent No.: US 11,569,739 B2
(45) Date of Patent: Jan. 31, 2023

(54) THREE-PORT CONVERTER WITH WIDE INPUT RANGE AND CONTROL METHOD THEREOF

(71) Applicant: TIANGONG UNIVERSITY, Tianjin (CN)

(72) Inventors: Shengwei Gao, Tianjin (CN); Qingtong Zhu, Tianjin (CN); Pingjuan Niu, Tianjin (CN); Guanheng Yu, Tianjin (CN); Bo Wang, Tianjin (CN)

(73) Assignee: TIANGONG UNIVERSITY, Tianjin (CN)

( * ) Notice: Subject to any disclaimer, the term of this patent is extended or adjusted under 35 U.S.C. 154(b) by 0 days.

(21) Appl. No.: 17/654,159

(22) Filed: Mar. 9, 2022

(65) Prior Publication Data

US 2022/0416659 A1    Dec. 29, 2022

(30) Foreign Application Priority Data

Jun. 23, 2021   (CN) .......................... 202110701530.9

(51) Int. Cl.
*H02M 3/155* (2006.01)
*H02M 3/158* (2006.01)
*H02J 7/34* (2006.01)
*H02J 7/35* (2006.01)

(52) U.S. Cl.
CPC ........... *H02M 3/1557* (2021.05); *H02J 7/345* (2013.01); *H02J 7/35* (2013.01); *H02M 3/1582* (2013.01)

(58) Field of Classification Search
CPC .... H02M 3/1557; H02M 3/1582; H02J 7/345; H02J 7/35
See application file for complete search history.

(56) References Cited

U.S. PATENT DOCUMENTS

| | | | |
|---|---|---|---|
| 2014/0152101 A1* | 6/2014 | Kusunose | H02J 3/0073 307/23 |
| 2016/0043597 A1* | 2/2016 | Kuwahara | H02M 3/04 307/23 |
| 2017/0062876 A1* | 3/2017 | Narla | H02H 3/087 |
| 2018/0037121 A1* | 2/2018 | Narla | H02J 7/35 |

* cited by examiner

*Primary Examiner* — Daniel Kessie
*Assistant Examiner* — Brian K Baxter
(74) *Attorney, Agent, or Firm* — Tutunjian & Bitetto, P.C.

(57) ABSTRACT

A three-port converter with a wide input range and a control method thereof are provided, which relates to a technical field of power electronic converters. The converter is provided with three ports of a photovoltaic cell PV, a storage battery Bat and a resistance load R, and includes a boost circuit (Boost) and a reversible boost-buck circuit (Sepic-Zeta). The boost circuit is configured to connect the photovoltaic cell PV and the load R; and the reversible boost-buck circuit is configured to connect the photovoltaic cell PV, the storage battery Bat, the storage battery Bat and the load R. The three-port converter of the present disclosure has advantages of a small size, a wide input range, a high integration level, high stability, high conversion efficiency, etc.

5 Claims, 5 Drawing Sheets

THREE-PORT CONVERTER WITH WIDE INPUT RANGE AND CONTROL METHOD THEREOF

CROSS REFERENCE TO RELATED APPLICATION(S)

This patent application claims the benefit and priority of Chinese Patent Application No. 202110701530.9 filed with the China National Intellectual Property Administration on Jun. 23, 2021, which is incorporated by reference herein in its entirety as part of the present application.

TECHNICAL FIELD

The present disclosure relates to the technical field of energy conversion for power electronics, in particular to a nonisolated three-port direct-current switching converter based on a reversible Sepic-Zeta with a wide input range and a control method thereof.

BACKGROUND

With increasing environmental problems and a shortage of fossil energy, renewable energy power generation technologies such as solar power generation and wind power generation have attracted widespread attention. A conventional photovoltaic energy-storage power generation system generally transmits energy through a combination of multiple two-port converters, which causes problems of an excessive quantity of converters, a large size, a low power density, etc. A three-port converter can be adopted to replace the original multiple two-port converters, which enables the system to have a simpler overall structure, a smaller size, a higher power density, etc. The three-port converter can achieve power generation of new energy, energy storage and load connection and control simply through one combined converter, which therefore effectively improves efficiency and power density of the system.

However, most existing nonisolated three-port switching DC-DC converters limit the relationship between a voltage of a photovoltaic cell and a voltage of a storage battery to a certain degree. As referred to in [1] Wang Hui, Chen Yao, Zeng Qingdian, Li Shengqian, Zhu Binxin, A Multi-mode high-gain multi-port DC/DC converter [J]. Proceedings of The Chinese Society for Electrical Engineering, 2019,39 (07):2155-2166, the three-port converter is only suitable for an application scenario where a voltage $V_{pv}$ of the photovoltaic cell is less than a voltage $V_B$ of the storage battery, and in [2] Suresh, K. , et al. "Cost-efficient nonisolated three-port DC-DC converter for EV/HEV applications with energy storage." European transactions on electrical power engineering 29.10(2019):e12088.1-e12088.20., the three-port converters is only suitable for an application scenario where the voltage $V_{pv}$ of the photovoltaic cell is greater than the $V_B$. The mutually-limiting relation between the voltage of the photovoltaic cell and the voltage of the storage battery causes a narrow application range, poor stability, and low conversion efficiency, thereby affecting the performance of the converter during long-term use.

SUMMARY

To overcome the shortcomings in the conventional art, the present disclosure provides a three-port converter with a wide input range and a control method thereof. The three-port converter has advantages of a small size, a wide input range, a high integration level, high stability, high conversion efficiency, etc.

The technical solutions of the present disclosure are as follows.

A three-port converter with a wide input range and a control method thereof are provided. The converter is provided with three ports of a photovoltaic cell PV, a storage battery Bat, a resistance load R, a boost circuit (Boost) and a reversible boost-buck circuit (Sepic-Zeta). The boost circuit is configured to connect the photovoltaic cell PV and the load; and the reversible boost-buck circuit is configured to connect the photovoltaic cell PV, the storage battery Bat, the storage battery Bat and the load R. Specifically, in the boost circuit (Boost), a positive electrode of the photovoltaic cell PV is connected to an end of a capacitor $C_1$ and an anode of a diode $VD_1$, and an anode of a diode VD2 is connected to an end of an inductor $L_1$; a drain of a switching tube $S_4$ and an anode of a diode $VD_4$ are connected to an other end of the inductor $L_1$; a cathode of the diode $VD_4$ is connected to an end of an output filtering capacitor $C_4$ and an end of the load R; in the boost-buck circuit (Sepic-Zeta), a positive electrode of the storage battery Bat is connected to an end of a capacitor $C_2$ and an end of an inductor $L_2$, a drain of a switching tube $S_2$ and an end of a capacitor $C_3$ are connected to an other end of the inductor $L_2$, three branches are led out from an other end of the capacitor $C_3$ with the first branch connected to a source of a switching tube $S_1$, the second branch connected to a drain of a switching tube $S_3$, and the third branch connected to an end of an inductor $L_3$, a series circuit of the switching tube $S_1$ and the diode $VD_2$ is connected to a cathode of the diode $VD_1$ and the end of the inductor $L_1$, and a series circuit of the switching tube $S_3$ and a diode $VD_3$ is connected to the other end of the inductor $L_2$ and the anode of the diode $VD_4$; and the cathode of the diode $VD_4$ is connected to the end of the output filtering capacitor $C_4$ and the end of the load R; and an other end of the load R is connected to an other end of the output capacitor $C_4$, a source of the switching tube $S_4$, an other end of the inductor $L_3$, a source of the switching tube $S_2$, the other end of the capacitor $C_2$, a negative electrode of the storage battery Bat, an other end of the capacitor $C_1$, and a negative electrode of the photovoltaic cell PV.

The present disclosure further provides a nonisolated three-port direct-current switching converter based on a reversible Sepic-Zeta and with a wide input range and a control method thereof, the control method including following four operating modes which are specifically described as follows:

(1) an operating mode of a photovoltaic cell PV supplying power to a load R and charging a storage battery Bat:

in a case that neither a switching tube $S_2$ nor a switching tube $S_3$ operates, when a switching tube $S_1$ and a switching tube $S_4$ are turned on, the photovoltaic cell PV charges the storage battery Bat via a capacitor $C_3$ and an inductor $L_2$, and charges the inductor $L_2$ and an inductor $L_3$; when the switching tube $S_1$ is turned off and the switching tube $S_4$ continues to be turned on, the photovoltaic cell PV continues to charge an inductor $L_1$, the inductor $L_3$ charges the capacitor $C_3$, and the inductor $L_2$ supplies power to the load via freewheeling through a body diode of the switching tube $S_2$; when the switching tube $S_4$ and the switching tube $S_1$ are both turned off, the photovoltaic cell PV and an inductor $L_1$ charge the load, the inductor $L_3$ continues to charge the capacitor $C_3$, and the inductor $L_2$ continues to supply power to the load via freewheeling through a body diode of the switching tube $S_2$;

(2) an operating mode of the photovoltaic cell PV and the storage battery Bat jointly supplying power to the load R:

when a voltage $V_{pv}$ of the photovoltaic cell is greater than a voltage $V_B$ of the storage battery, the switching tube $S_1$ does not operate, and the switching tube S2 and the switching tube S3 are turned on complementarily; when the switching tube $S_2$ is turned on and the switching tube S3 and the switching tube S4 are turned off, the photovoltaic cell PV and an inductor $L_1$ supply power to the load R, the storage battery Bat charges the inductor $L_2$, and the capacitor $C_3$ charges the inductor $L_3$; when the switching tube $S_2$ continues to be turned on, the switching tube S3 continues to be turned off, and the switching tube $S_4$ is turned on, the photovoltaic cell PV charges the inductor $L_1$, the storage battery Bat continues to charge the inductor $L_2$, and the capacitor $C_3$ continues to charge the inductor $L_3$; when the switching tube $S_3$ is turned on and the switching tube $S_2$ and the switching tube $S_4$ are turned off, the photovoltaic cell PV and the inductor $L_1$ supply power to the load R, the storage battery Bat and the inductor supply power to the load via the capacitor $C_3$, and the inductor $L_3$ also supplies power to the load R;

when the voltage $V_{pv}$ of the photovoltaic cell PV is smaller than the voltage $V_B$ of the storage battery and a duty ratio of the switching tube $S_2$ is smaller than that of the switching tube $S_4$, the switching tube $S_1$ does not operate; when the switching tube $S_4$ is turned on and the switching tube S2 and the switching tube S3 are turned off, the photovoltaic cell PV charges the inductor $L_1$; when the switching tube $S_4$ continues to be turned on continuously, the switching tube $S_3$ continues to be turned off, and the switching tube $S_2$ is turned on, the photovoltaic cell PV continues to charge the inductor $L_1$, the storage battery Bat charges the inductor $L_2$, and the capacitor $C_3$ charges the inductor $L_3$; when the switching tubes $S_2$ and $S_4$ are turned off and the switching tube $S_3$ is turned on, the photovoltaic cell PV and the inductor $L_1$, the storage battery Bat and the inductors $L_2$ and $L_3$ supply power to the load R simultaneously;

(3) an operating mode of the storage battery Bat separately supplying power to the load R:

in a case that neither the switching tube $S_1$ nor the switching tube $S_4$ operates, the switching tube $S_2$ and the switching tube $S_3$ are turned on complementarily, and input power of the photovoltaic cell PV is zero; when the switching tube $S_2$ is turned on and the switching tube $S_3$ is turned off, the storage battery Bat charges the inductor $L_2$, and the capacitor $C_3$ charges the inductor $L_3$; when the switching tube S2 is turned off and the switching tube $S_3$ is turned on, energy in the storage battery Bat and the inductors $L_2$ and $L_3$ is supplied to the load R via the switching tube $S_3$; and (4) an operating mode of the photovoltaic cell PV separately supplying power to the load R:

in a case that none of the switching tube $S_1$, the switching tube $S_2$ and the switching tube $S_3$ operate, when the switching tube $S_4$ is turned on, the photovoltaic cell PV charges the inductor $L_1$, and when the switching tube $S_4$ is turned off, the photovoltaic cell PV and the inductor $L_1$ simultaneously supply power to the load R.

Compared with the conventional art, the present disclosure achieves the following beneficial effects.

The present disclosure achieves a wide input voltage range, the photovoltaic cell PV and the storage battery Bat are connected via the reversible boost-buck circuit (Sepic-Zeta), such that the three-port converter operates not only in a case that the voltage $V_{pv}$ of the photovoltaic cell is greater than the voltage $V_B$ of the storage battery, but also in a case that voltage $V_{pv}$ of the photovoltaic cell is smaller than the voltage $V_B$ of the storage battery. The three-port converter of the present disclosure further has the advantages of a small size, a high integration level, high stability, high conversion efficiency, etc.

DETAILED DESCRIPTION OF THE EMBODIMENTS

The technical solutions of the present disclosure are described in detail below with reference to the drawings.

Figure 1:
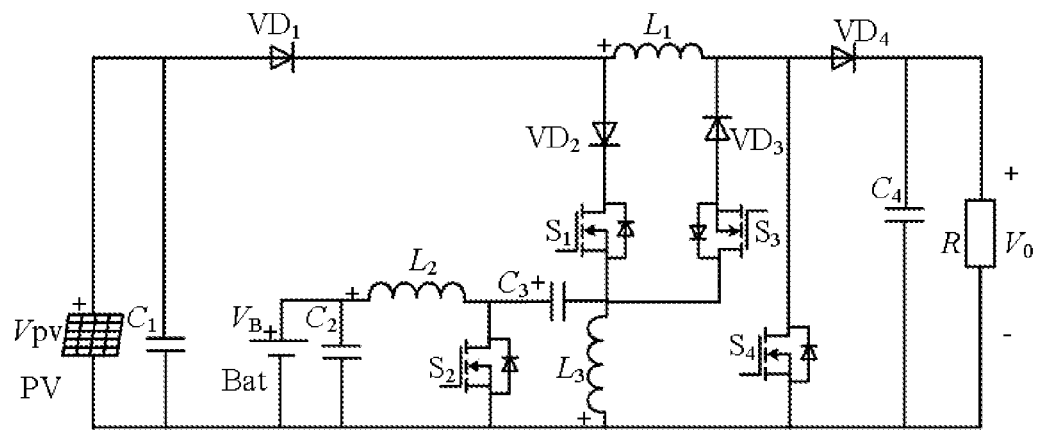
FIG. 1 is a topology of a nonisolated three-port direct-current switching converter according to the present disclosure.

A three-port converter with a wide input range according to the present disclosure, as shown in FIG. 1, is provided with three ports of a photovoltaic cell PV, a storage battery Bat, and a resistance load R, and includes a boost circuit (Boost) and a reversible boost-buck circuit (Sepic-Zeta), where the boost circuit is configured to connect the photovoltaic cell PV and the load, and the reversible boost-buck circuit is configured to connect the photovoltaic cell PV, the storage battery Bat, the storage battery Bat and the load R. Specifically, in the boost circuit (Boost), a positive electrode of the photovoltaic cell PV is connected to an end of a capacitor C1 and an anode of a diode VD1, and an anode of a diode VD2 is connected to an end of an inductor L1. A drain of a switching tube S4 and an anode of a diode VD4 are connected to an other end of the inductor L1; a cathode of the diode VD4 is connected to an end of an output filtering capacitor C4 and an end of the load R; in the boost-buck circuit (Sepic-Zeta), a positive electrode of the storage battery Bat is connected to an end of a capacitor C2 and an end of an inductor L2, a drain of a switching tube S2 and an end of a capacitor C3 are connected to an other end of the inductor L2, three branches are led out from an other end of the capacitor C3 with a first branch connected to a source of a switching tube S1, a second branch connected to a drain of a switching tube S3, and a third branch connected to an end of an inductor L3, a series circuit of the switching tube S1 and the diode $VD_2$ is connected to a cathode of the diode VD1 and the end of the inductor L1, and a series circuit of the switching tube S3 and a diode VD3 is connected to the other end of the inductor L2 and the anode of the diode VD4. The cathode of the diode VD4 is connected to the end of the output filtering capacitor C4 and the end of the load R; and an other end of the load R is connected to an other end of the output capacitor C4, a source of the switching tube S4, an other end of the inductor L3, a source of the switching tube S2, the other end of the capacitor C2, a negative electrode of the storage battery Bat, an other end of the capacitor C1, and a negative electrode of the photovoltaic cell PV.

The present disclosure further provides a control method of a three-port converter with a wide input range, the control method including the following four operating modes as specifically described below.

(1) An operating mode of the photovoltaic cell PV supplying power to the load and charging the storage battery Bat:

In a case that neither the switching tube S2 nor the switching tube S3 operates, when the switching tube S1 and the switching tube S4 are turned on, the photovoltaic cell PV charges the storage battery Bat via the capacitor C3 and the inductor L2, and charges the inductor L2 and an inductor L3; when the switching tube S1 is turned off and the switching tube S4 continues to be turned on, the photovoltaic cell PV continues to charge the inductor L1, the inductor L3 charges the capacitor C3, and the inductor L2 supplies power to the load via freewheeling through a body diode of the switching tube S2; when the switching tube S4 and the switching tube S1 are both turned off, the photovoltaic cell PV and the inductor L1 supply power to the load, the inductor L3 continues to charge the capacitor C3, and the inductor L2 continues to supply power to the load via freewheeling through the body diode of the switching tube S2.

(2) An operating mode of the photovoltaic cell PV and the storage battery Bat jointly supplying power to the load R:

When a voltage Vpv of the photovoltaic cell is greater than a voltage VB of the storage battery, the switching tube S1 does not operate, and the switching tube S2 and the switching tube S3 are turned on complementarily; when the switching tube S2 is turned on and the switching tube S3 and the switching tube S4 are turned off, the photovoltaic cell PV and the inductor L1 supply power to the load R, the storage battery Bat charges the inductor L2, and the capacitor C3 charges the inductor L3; when the switching tube S2 continues to be turned on, the switching tube S3 continues to be turned off, and the switching tube S4 is turned on, the photovoltaic cell PV charges the inductor L1, the storage battery Bat continues to charge the inductor L2, and the capacitor C3 continues to charge the inductor L2; when the switching tube S3 is turned on and the switching tube S2 and the switching tube S4 are turned off, the photovoltaic cell PV and the inductor L1 supply power to the load R, the storage battery Bat and the inductor supply power to the load via the capacitor C3, and the inductor L3 also supplies power to the load R;

when the voltage Vpv of the photovoltaic cell PV is smaller than the voltage VB of the storage battery and a duty ratio of the switching tube S2 is smaller than that of the switching tube S4, the switching tube S1 does not operate; when the switching tube S4 is turned on and the switching tube S2 and the switching tube S3 are turned off, the photovoltaic cell PV charges the inductor L1; when the switching tube S4 continues to be turned on, the switching tube S3 continues to be turned off, and the switching tube S2 is turned on, the photovoltaic cell PV continues to charge the inductor L1, the storage battery Bat charges the inductor L2, and the capacitor C3 charges the inductor L3; when the switching tubes S2 and S4 are turned off and the switching tube S3 is turned on, the photovoltaic cell PV, the inductor $L_1$, the storage battery Bat and the inductors L2 and L3 supply power to the load R simultaneously.

(3) The operating mode of storage battery Bat separately supplying power to the load R:

In a case that neither the switching tube S1 nor the switching tube S4 operates, the switching tube S2 and the switching tube S3 are turned on complementarily, and input power of the photovoltaic cell PV is zero; when the switching tube S2 is turned on and the switching tube S3 is turned off, the storage battery Bat charges the inductor L2, and the capacitor C3 charges the inductor L3; when the switching tube S2 is turned off and the switching tube S3 is turned on, energy in the storage battery Bat and the inductors L2 and L3 is supplied to the load R via the switching tube S3.

(4) An operating mode of photovoltaic cell PV separately supplying power to the load R:

In a case that none of the switching tube S1, the switching tube S2 and the switching tube S3 operate, when the switching tube S4 is turned on, the photovoltaic cell PV charges the inductor L1, and when the switching tube S4 is turned off, the photovoltaic cell PV and the inductor L1 simultaneously supply power to the load R.

The converter of the present disclosure can operate not only in a case that the voltage Vpv of the photovoltaic cell is greater than the voltage VB of the storage battery, but also in a case that the voltage Vpv of the photovoltaic cell is smaller than the voltage VB of the storage battery. The converter improves system stability and efficiency, and thus is applicable to scenarios of high power density.

Figure 2:
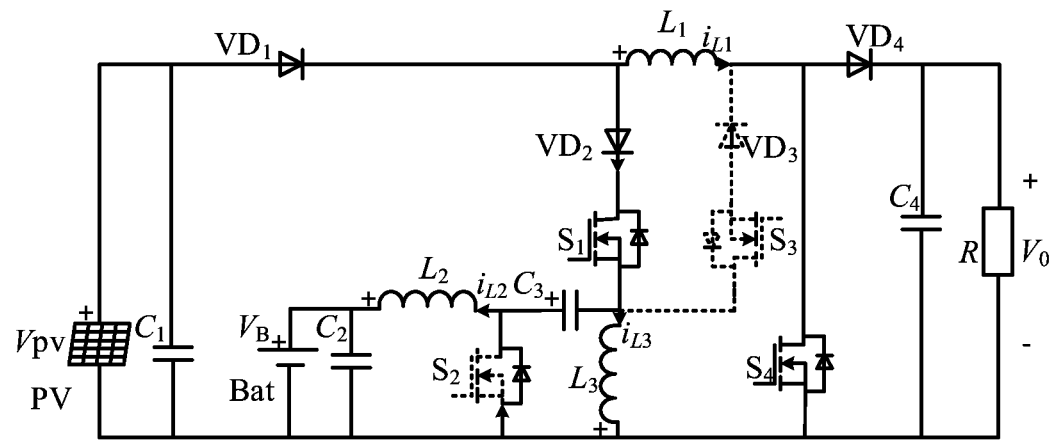
FIG. 2 is an equivalent circuit diagram illustrating an operating process of a photovoltaic cell PV supplying power to a load R and charging a storage battery Bat according to the present disclosure.

FIG. 2 is an equivalent circuit diagram illustrating an operating process of the photovoltaic cell PV supplying power to the load R and charging the storage battery Bat according to the converter of the present disclosure; at this moment, the switching pipe S2 and the switching pipe S3 keep turned off, the photovoltaic cell supplies power to the load and the storage battery simultaneously, and duty ratios of two switching tubes S1 and S4, i.e., D1 and D4 respectively, as two independent control variables, control power transmission; as shown in this Figure, the voltage of the photovoltaic cell is represented as Vpv, the voltage of the storage battery is represented as VB, a voltage of the load is represented as V0, and based on the voltage-second balance characteristic of inductance, the relationship between the voltage Vpv of the photovoltaic cell, the voltage V0 of the storage battery, the voltage Vpv of the photovoltaic cell and the voltage VB of the storage battery can be concluded as follows:

$$V_0 = \frac{1}{1-D_4} V_{PV} \quad (1)$$

$$V_B = \frac{D_1}{1-D_1} V_{PV} \quad (2)$$

Figure 6:
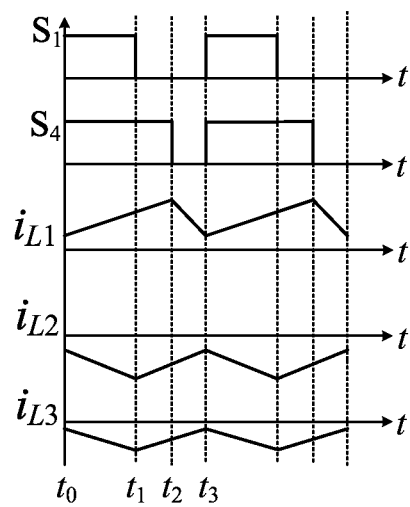
FIG. 6 is an operating waveform diagram illustrating the photovoltaic cell PV supplying power to the load R and charging the storage battery Bat according to the present disclosure.

The operating waveforms in this mode are shown in FIG. 6. When the switching tube S1 and the switching tube S4 are both turned on, a current iL1 of the inductor L1 rises linearly, and a current iL2 of the inductor L2 and a current iL3 of the inductor L3 rise linearly in a reverse manner; when the switching tube S1 is turned off and the switching tube S4 continues to be turned on, the current of the inductor L1 continues to rise linearly, the inductor L2 charges the battery via freewheeling through the body diode of the switching tube S2, the current of the inductor L2 falls linearly in a reverse manner, the inductor L3 charges the capacitor C3 via freewheeling through the body diode of the switching tube S2, and the current of the inductor L3 falls linearly in a reverse manner.

Figure 3:
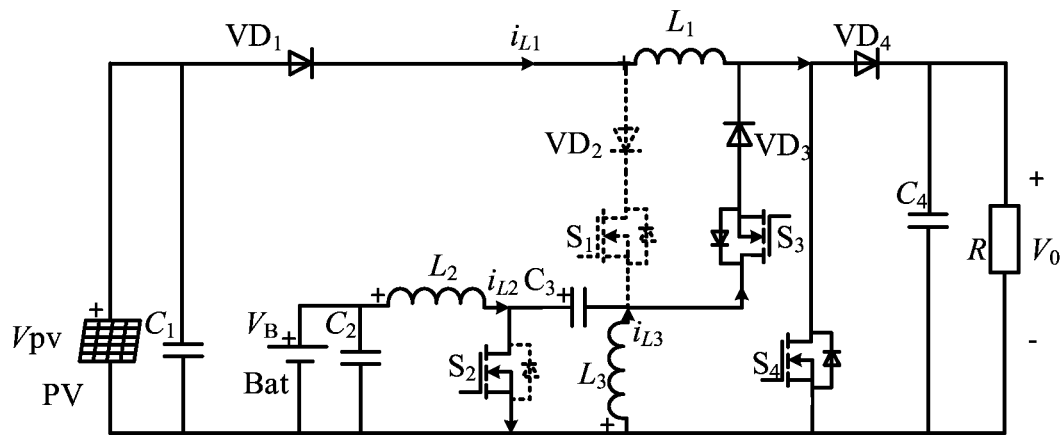
FIG. 3 is an equivalent circuit diagram illustrating an operating process of the photovoltaic cell PV and the storage battery Bat jointly supplying power to the load R according to the present disclosure.

FIG. 3 is an equivalent circuit diagram illustrating the operating process of the photovoltaic cell PV and a storage battery Bat jointly supplying power to the load according to the converter of the present disclosure, and at this moment, the switching tube S1 keeps turned off. The photovoltaic cell PV and the storage battery Bat simultaneously supply power to the load R, and by controlling the duty ratios of the switching pipe S2, the switching pipe S3 and the switching pipe S4, distribution control over input powers of two input sources is completed; the duty ratios of the switching pipe S2, the switching pipe S3 and the switching pipe S4 are represented as D2, D3 and D4 respectively, as shown in this Figure, the voltage of the photovoltaic cell is represented as Vpv, the voltage of the storage battery is represented as VB, the voltage of the load is represented as V0, and based on the voltage-second balance characteristic of inductance, the relationship between the voltage VB of the storage battery and the voltage of the load can be concluded as follows:

$$V_0 = \frac{D_2}{1-D_2} V_B \quad (3)$$

Figure 7:
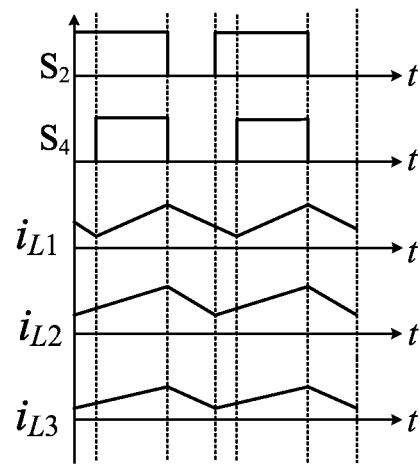
FIG. 7 and FIG. 8 are operating waveform diagrams illustrating the photovoltaic cell PV and the storage battery Bat jointly supplying power to the load R according to the present disclosure.

In this mode, when the voltage Vpv of the photovoltaic cell is greater than the voltage VB of the storage battery, the operating waveforms are shown in FIG. 7. When the switching tube S2 and the switching tube S4 are turned on, and the switching tube S3 is turned off, the inductor L1 is charged by the photovoltaic cell PV, the inductor L2 is charged by the storage battery Bat, the inductor L3 is charged by the capacitor C3, and currents of the inductors L1, L2 and L3 rise linearly; when the switching tube S2 and the switching tube S4 are both turned off, and the switching tube S3 is turned on, currents of the inductors L1, L2 and L3 fall linearly; when the switching tubes S4 and S3 are turned off and the switching tube S2 is turned on, the current of the inductor L1 continues to fall, and currents of the inductors L2 and L3 rise linearly.

Figure 8:
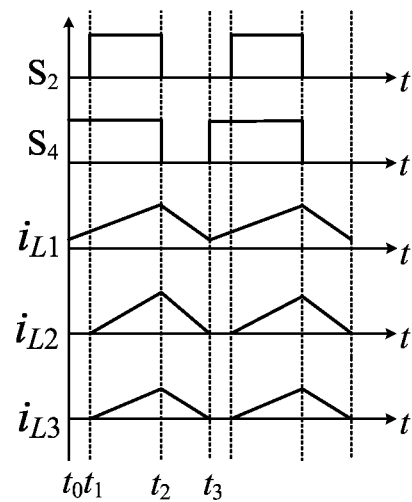

When the voltage Vpv of the photovoltaic cell is smaller than the voltage VB of the storage battery and the duty ratio of the switching tube S2 is smaller than that of the switching tube S4, the operating waveforms are shown in FIG. 8. When the switching tube S2 and the switching tube S3 are turned off, and the switching tube S4 is turned on, the photovoltaic cell PV charges the inductor L1, the current of the inductor L1 rises linearly, and the currents of the inductor L2 and the inductor L3 are zero; when the switching tube S2 and the switching tube S4 are turned on simultaneously, and the switching tube S3 continues to be turned off, the currents of the inductors L1, L2 and L3 rise linearly; when the switching tube S2 and the switching tube S4 are both turned off, and the switching tube S3 is turned on, currents of the inductors L1, L2 and L3 fall linearly.

Figure 4:
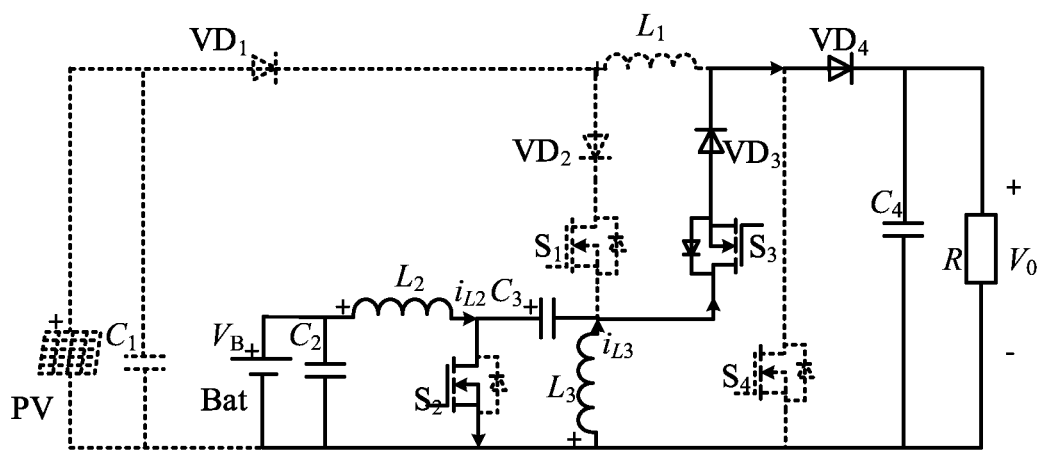
FIG. 4 is an equivalent circuit diagram illustrating an operating process of the storage battery Bat separately supplying power to the load R according to the present disclosure.

FIG. 4 is an equivalent circuit diagram illustrating the operating process of a storage battery Bat separately supplying power to the load R according to the present disclosure. At this moment, the switching tube S1 and the switching tube S4 keep turned off, the storage battery Bat separately supplies power to the load R, and by controlling duty ratios of the switching pipe S2 and the switching pipe S3, distribution control over input powers of the storage battery is completed; duty ratios of the switching pipe S2 and the switching pipe S3 are represented as D2 and D3 respectively, as shown in this Figure, the voltage of the storage battery is represented as VB, the voltage of the load is represented as V0, and the relationship between the voltage of the storage battery and the voltage of the load concluded based on the voltage-second balance characteristic of inductance is shown in Formula (3).

Figure 9:
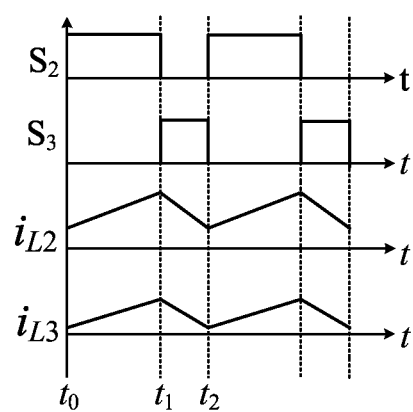
FIG. 9 is an operating waveform diagram illustrating the storage battery Bat separately supplying power to the load R according to the present disclosure.

The operating waveforms in this mode are shown in FIG. 9. When the switching tube S2 is turned on and the switching tube S3 is turned off, the storage battery Bat charges the inductor L2, the capacitor C3 charges the inductor L3, and currents of both the inductor L2 and the inductor L3 rise linearly. When the switching tube S2 is turned off, the switching tube S3 is turned on, the storage battery, the inductor L2 and the inductor L3 jointly supply power to the load, and the currents of the inductor L2 and the inductor L3 fall linearly.

Figure 5:
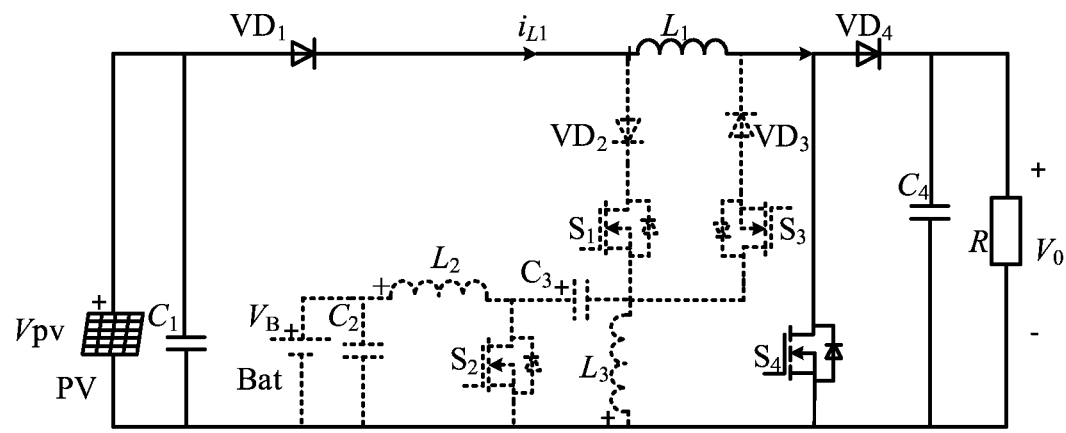
FIG. 5 is an equivalent circuit diagram illustrating an operating process of the photovoltaic cell PV separately supplying power to the load R according to the present disclosure.

FIG. 5 is an equivalent circuit diagram illustrating the operating process of the photovoltaic cell PV separately supplying power to the load R according to the present disclosure. At this moment, the switching tube S1, the switching tube S2 and the switching tube S3 keep turned off, the photovoltaic cell PV separately supplies power to the load R, and by controlling a duty ratio of the switching pipe S4, distribution control over input power of the photovoltaic cell is completed; the duty ratio of the switching pipe S4 is represented as D4, and as shown in this Figure, the voltage of the photovoltaic cell is represented as Vpv, the voltage of the load is represented as V0, and the relationship between the voltage of the photovoltaic cell and the voltage of the load concluded based on the voltage-second balance characteristic of inductance is shown in Formula (1).

Figure 10:
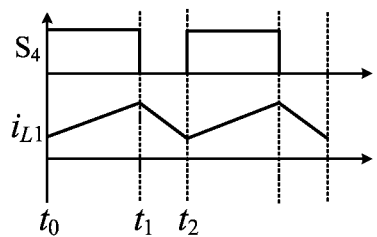
FIG. 10 is an operating waveform diagram illustrating the photovoltaic cell PV separately supplying power to the load R according to the present disclosure.

The operating waveforms in this mode are shown in FIG. 10. When the switching tube S4 is turned on, the photovoltaic cell PV charges the inductor L1. In a case that the current of the inductor L1 rises linearly, when the switching tube S4 is turned off, the photovoltaic cell PV and the inductor L1 simultaneously supply power to the load R, and the current of the inductor L1 falls linearly.

The above displays and describes the basic principles, main features and advantages of the present disclosure. The components described herein are common technologies in the conventional art. It should be understood by those skilled in the art that, the present disclosure is not limited by the aforementioned embodiments, and the aforementioned embodiments and the description only illustrate the principles of the present disclosure. Various changes and modifications may be made to the present disclosure without departing from the spirit and scope of the present disclosure, and such changes and modifications shall fall within the claimed scope of the present disclosure. The protection scope of the present disclosure is defined by the appended claims and their equivalents.

What is claimed is:

1. A three-port converter with a wide input range, comprising:
   a photovoltaic cell (PV) having a positive electrode and a negative electrode,
   a storage battery (Bat) having a positive electrode and a negative electrode, a resistance load R,
a boost circuit (Boost) configured to connect the photovoltaic cell PV and the resistance load R, and
a reversible boost-buck circuit (Sepic-Zeta) configured to connect the photovoltaic cell PV, the storage battery (Bat) and the resistance load R;
wherein in the boost circuit (Boost), the positive electrode of the photovoltaic cell PV is connected to an end of a capacitor $C_1$ and an anode of a diode $VD_1$, an anode of a diode $VD_2$ is connected to an end of an inductor $L_1$, and a drain of a switching tube $S_4$ and an anode of a diode $VD_4$ are connected to an other end of the inductor $L_1$; a cathode of the diode $VD_4$ is connected to an end of an output filtering capacitor $C_4$ and an end of the resistance load R;
wherein in the reversible boost-buck circuit (Sepic-Zeta), the positive electrode of the storage battery (Bat) is connected to an end of a capacitor $C_2$ and an end of an inductor $L_2$, a drain of a switching tube $S_2$ and an end of a capacitor $C_3$ are connected to an other end of the inductor $L_2$, three branches are led out from an other end of the capacitor $C_3$ with a first branch connected to a source of a switching tube $S_1$, a second branch connected to a drain of a switching tube $S_3$, and a third branch connected to an end of an inductor $L_3$, a series circuit of the switching tube $S_1$ and the diode $VD_2$ is connected to a cathode of the diode $VD_1$ and the end of the inductor $L_1$, and a series circuit of the switching tube $S_3$ and a diode $VD_3$ is connected to the other end of the inductor $L_2$ and the anode of the diode $VD_4$; and the cathode of the diode $VD_4$ is connected to the end of the output filtering capacitor $C_4$ and the end of the resistance load R; and an other end of the resistance load R is connected to an other end of the output capacitor $C_4$, a source of the switching tube $S_4$, an other end of the inductor $L_3$, a source of the switching tube $S_2$, the other end of the capacitor $C_2$, the negative electrode of the storage battery Bat, an other end of the capacitor $C_1$, and the negative electrode of the photovoltaic cell (PV).

2. The three-port converter with the wide input range according to claim 1, wherein the photovoltaic cell (PV) and the storage battery (Bat) are connected via the reversible boost-buck circuit (Sepic-Zeta), such that a nonisolated three-port direct-current switching converter operates not only in a case that the voltage $V_{pv}$ of the photovoltaic cell is greater than the voltage $V_B$ of the storage battery, but also in a case that the voltage $V_{pv}$ of the photovoltaic cell is smaller than the voltage $V_B$ of the storage battery.

3. The three-port converter with the wide input range according to claim 1, wherein the resistance load R is provided with three ports.

4. The three-port converter with the wide input range according to claim 3, wherein the photovoltaic cell (PV) and the storage battery (Bat) are connected via the reversible boost-buck circuit (Sepic-Zeta), such that a nonisolated three-port direct-current switching converter operates not only in a case that the voltage $V_{pv}$ of the photovoltaic cell is greater than the voltage $V_B$ of the storage battery, but also in a case that the voltage $V_{pv}$ of the photovoltaic cell is smaller than the voltage $V_B$ of the storage battery.

5. A control method of a three-port converter with a wide input range, wherein the control method comprises following four operating modes:
(1) an operating mode of a photovoltaic cell (PV) supplying power to a resistance load R and charging a storage battery (Bat):
in a case that neither a switching tube $S_2$ nor a switching tube S3 operates, when a switching tube $S_1$ and a switching tube $S_4$ are turned on, the photovoltaic cell (PV) charges the storage battery (Bat) via a capacitor $C_3$ and an inductor $L_2$, and charges the inductor $L_2$ and an inductor $L_3$; when the switching tube $S_1$ is turned off and the switching tube $S_4$ continues to be turned on, the photovoltaic cell (PV) continues to charge an inductor $L_1$, the inductor $L_3$ charges the capacitor $C_3$, and the inductor $L_2$ supplies power to the resistance load R via freewheeling through a body diode of the switching tube $S_2$; when both the switching tube $S_4$ and the switching tube $S_1$ are turned off, the photovoltaic cell (PV) and the inductor $L_1$ supply power to the resistance load R, the inductor $L_3$ continues to charge the capacitor $C_3$, and the inductor $L_2$ continues to supply power to the resistance load R via freewheeling through the body diode of the switching tube $S_2$;
(2) an operating mode of the photovoltaic cell (PV) and the storage battery (Bat) jointly supplying power to the resistance load R:
when a voltage $V_{pv}$ of the photovoltaic cell is greater than a voltage $V_B$ of the storage battery, the switching tube $S_1$ does not operate, and the switching tube $S_2$ and the switching tube $S_3$ are turned on complementarily; when the switching tube $S_2$ is turned on and the switching tube $S_3$ and the switching tube $S_4$ are turned off, the photovoltaic cell (PV) and the inductor $L_1$ supply power to the resistance load R, the storage battery Bat charges the inductor $L_2$, and the capacitor $C_3$ charges the inductor $L_3$; when the switching tube $S_2$ continues to be turned on, the switching tube $S_3$ continues to be turned off, and the switching tube $S_4$ is turned on, the photovoltaic cell (PV) charges the inductor $L_1$, the storage battery (Bat) continues to charge the inductor $L_2$, and the capacitor $C_3$ continues to charge the inductor $L_2$; when the switching tube $S_3$ is turned on and the switching tube $S_2$ and the switching tube $S_4$ are turned off, the photovoltaic cell (PV) and the inductor $L_1$ supply power to the load, the storage battery (Bat) and the inductor supply power to the resistance load R via the capacitor $C_3$, and the inductor $L_3$ also supplies power to the resistance load R;
when the voltage $V_{pv}$ of the photovoltaic cell (PV) is smaller than the voltage $V_B$ of the storage battery and a duty ratio of the switching tube $S_2$ is smaller than that of the switching tube $S_4$, the switching tube $S_1$ does not operate; when the switching tube $S_4$ is turned on and the switching tube $S_2$ and the switching tube $S_3$ are turned off, the photovoltaic cell (PV) charges the inductor $L_1$; when the switching tube $S_4$ continues to be turned on, the switching tube $S_3$ continues to be turned off, and the switching tube $S_2$ is turned on, the photovoltaic cell (PV) continues to charge the inductor $L_1$, the storage battery (Bat) charges the inductor $L_2$, and the capacitor $C_3$ charges the inductor $L_3$; when the switching tubes $S_2$ and $S_4$ are turned off and the switching tube $S_3$ is turned on, the photovoltaic cell (PV) and the inductor $L_1$, the storage battery (Bat) and the inductors $L_2$ and $L_3$ supply power to the load simultaneously;
(3) an operating mode of the storage battery (Bat) separately supplying power to the resistance load R:
in a case that neither the switching tube $S_1$ nor the switching tube $S_4$ operates, the switching tube $S_2$ and the switching tube $S_3$ are turned on complementarily, and input power of the photovoltaic cell (PV) is zero; when the switching tube $S_2$ is turned on and the switching tube $S_3$ is turned off, the storage battery (Bat) charges the inductor $L_2$, and the capacitor $C_3$ charges the inductor $L_3$; when the switching tube $S_2$ is turned off and the switching tube $S_3$ is turned on, energy in the storage battery (Bat) and the inductors $L_2$ and $L_3$ is supplied to the resistance load R via the switching tube $S_3$; and (4) an operating mode of the photovoltaic cell (PV) separately supplying power to the load R:

in a case that none of the switching tube $S_1$, the switching tube $S_2$ and the switching tube $S_3$ operate, when the switching tube $S_4$ is turned on, the photovoltaic cell (PV) charges the inductor $L_1$, and when the switching tube $S_4$ is turned off, the photovoltaic cell (PV) and the inductor $L_1$ simultaneously supply power to the resistance load R.

* * * * *